United States Patent [19]
Yamaguchi et al.

[11] 3,853,922
[45] Dec. 10, 1974

[54] PROCESS FOR PRODUCING TETRAHYDROFURAN

[75] Inventors: Mitsuo Yamaguchi; Yoichi Kageyama, both of Yokohama, Japan

[73] Assignee: Mitsubishi Chemical Industries Ltd., Tokyo, Japan

[22] Filed: June 13, 1972

[21] Appl. No.: 262,186

Related U.S. Application Data

[63] Continuation-in-part of Ser. No. 847,467, Aug. 4, 1969, abandoned.

[30] Foreign Application Priority Data

Aug. 10, 1968  Japan.............................. 43-56889
Aug. 10, 1968  Japan.............................. 43-56890

[52] U.S. Cl........ 260/346.1 R, 260/343.6, 252/432, 252/466 J, 252/470, 252/471, 252/472, 252/473
[51] Int. Cl............................................ C07d 5/02
[58] Field of Search ............................ 260/346.1 R

[56] References Cited
UNITED STATES PATENTS

| | | | |
|---|---|---|---|
| 2,130,501 | 9/1938 | Lazier .......................... | 260/346.1 R |
| 2,772,293 | 11/1956 | Gilbert et al.................. | 260/346.1 R |
| 3,370,067 | 2/1968 | Johnson ....................... | 260/346.1 R |
| 3,492,314 | 1/1970 | Asano et al..................... | 260/346.1 |

*Primary Examiner*—Henry R. Jiles
*Assistant Examiner*—Bernard I. Dentz
*Attorney, Agent, or Firm*—Hans Berman; Kurt Kelman

[57] ABSTRACT

Tetrahydrofuran is produced in high yields by hydrogenation of maleic or fumaric acid or their derivatives or γ-butyrolactone in the presence of a catalyst which is an intimate mixture of metallic nickel with metallic cobalt and/or iron and an oxide of aluminum, boron, beryllium, magnesium, calcium, manganese, chromium, zinc, zirconium, molybdenum, thorium, tungsten, titanium, or vanadium, with or without addition of metallic copper. γ-butyrolactone, when formed as a by-product, and unreacted starting material may be recycled, and no significant amounts of other by-products are formed at relatively low temperatures and pressures.

7 Claims, No Drawings

PROCESS FOR PRODUCING TETRAHYDROFURAN

This application is a continuation-in-part of the co-pending Ser. No. 847,467, filed on Aug. 4, 1969, and now abandoned.

Heretofore, tetrahydrofuran was known to be produced by catalytic hydrogenation of maleic anhydride and its homologues. The hydrogenation reaction is carried through the following steps, for example as for maleic anhydride;

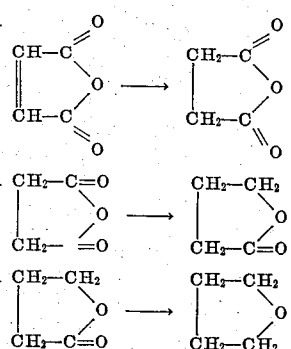
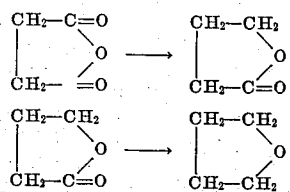
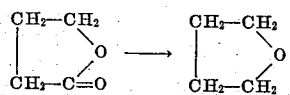

Reaction A itself can be carried out under very mild reaction conditions, i.e., at low temperature and low hydrogen pressure, on the contrary Reaction B or C requires more radical condition. To carry Reaction A in a reaction condition suitable for Reaction B and C does not cause a good result, because maleic anhydride and their homologues are easily converted to a pitch-like material at a higher temperature. Each unit reaction of Reaction A and B would be carried under a similar reaction condition. However, in a case of hydrogenating succinic anhydride to tetrahydrofuran in one step process, whatever conditions be selected, Reaction C will hardly arise while a substantial amount of succinic anhydride, i.e., the raw material of Reaction B, remains in the reaction space. Therefore, in the prior art, to obtain tetrahydrofuran rather than γ-butyrolactone as a main product from maleic anhydride by one stage hydrogenation has been almost impossible. Even if it is possible, it would result in forming by-products at a selectivity over 10 percent.

In order to eliminate the considerable defects encountered with the prior art, and to make a drastic improvement in them, it has been found imperative to effectively control the reaction conditions for each step. However, the assurance of such control proved extremely difficult and complicated in practice as well as in theory. Therefore, to best possibly remedy the situation, another extended study was continued. As a result, a catalyst was finally found requiring no control of the reaction conditions.

Heretofore, various catalysts have been proposed. Examples of the catalyst are Raney nickel (U.S. Pat. No. 2,772,292), Raney cobalt (U.S. Pat. No. 2,772,292), nickel molybdate (U.S. Pat. Nos. 2,772,291 and 2,772,293), cobalt molybdate (U.S. Pat. No. 2,772,293) and nickel molybdate-nickel chromate (U.S. Pat. No. 2,772,293). Similarly, γ-butyrolactone is produced by using a catalyst in the form of copper-zinc oxide (Japanese Pat. No. 5391/1968), copper-chromium oxide-zinc oxide (Japanese Pat. Nos. 1367/1953 and 17818/1967) and nickel-rhenium (Japanese Pat. No. 6947/1968). Additionally, Lazier (U.S. Pat. No. 2,130,501) and Johnson (U.S. Pat. No. 3,370,067) teach many metals including nickel, cobalt, iron and copper to be useful as an active component of reduction reaction. However, for the production of tetrahydrofuran, the use of abovementioned catalysts or a catalyst having any known combination of said components results in low yield of tetrahydrofuran and formation of relatively large amount of by-products. The most progressed catalyst system known by a person ordinary skilled in the art until now is nickel-rhenium catalyst, but even the catalyst does not causes over 70 percent total yield of tetrahydrofuran and γ-butyrolactone in one pass reaction without forming by-products of over 10 percent yield when a main product is intended to be tetrahydrofuran rather than γ-butyrolactone. Moreover the catalyst still needs adjusting the reaction conditions to the each step. Accordingly, none of the above-mentioned catalysts entirely satisfies the requirements for producing tetrahydrofuran on a commercial basis.

By our inventors a novel catalyst system is found with which tetrahydrofuran can be produced in high yield by one step catalytic hydrogenation of maleic anhydride and homologues thereof.

An object of this invention, therefore, is to provide a process for producing tetrahydrofuran in high yield avoiding the formation of undesirable by-products. Another object is to provide an efficient catalyst with which tetrahydrofuran can be produced in high yield by one step hydrogenation with less by-products. Still another object is to provide a process which can be carried out without need for pressures and temperatures, as high as required in the prior art processes. Still another object is to provide a novel hydrogenation catalyst system which maintains high activity in stable state and can be stored for a long time. The objects abovementioned are readily accomplished by the process of this invention in which tetrahydrofuran is produced by reacting a feed compound selected from the group consisting of maleic acid, maleic anhydride, esters of maleic acid, fumaric acid, esters of fumaric acid, succinic acid, esters of succinic acid, succinic anhydride and γ-butyrolactone with hydrogen in the presence of a catalyst containing active components of (a) metallic nickel, (b) at least one hardly reducible oxide of a metallic element and (c) at least one member selected from the group consisting of metallic iron and metallic cobalt with or without addition of metallic copper.

The preferred examples of said metallic elements in the component (b) above are beryllium, magnesium, calcium, boron, aluminum, titanium, vanadium, chromium, manganese, zinc, zirconium, molybdenum, tungsten, and thorium. The most suitable metal oxides are aluminum oxide (alumina) and titanium oxide (titania). In general, satisfactory results are obtained by employing only one metal oxide but, in some cases, two or more metal oxides may be incorporated with other active components. In the preparation of the catalyst, it is preferred to use a metal compound which readily converts to the oxide in the course of the heat treatment encountered in the preparation, for example, oxidation, reduction, decomposition or drying. Examples of preferred metal compounds are hydroxides and inorganic and organic salts, such as nitrate, chloride, formate or acetate.

The proportion of active components in the catalyst is an important factor and the proportion of metallic nickel : metal oxide : metallic iron : metallic cobalt is generally equivalent by weight to 1 : 0.04 – 10 : 0.02 – 10 : 0.02 – 10 with the preferred range being 1 : 0.1 – 6 : 0.1 – 6 : 0.1 – 6. In case either metallic iron or cobalt is used alone, the proportion of it is still 0.02 – 10. The proportions vary within the above-mentioned ranges depending upon various factors, for example, kind of feed compounds employed, kind of desired products and conditions of the reaction, but anyone skilled in the art will readily determine the optimum proportions by simple experiment.

The catalyst can be used with or without carrier, but the preferred way is a form supported on a suitable carrier. Preferred carriers include high siliceous materials, i.e., whose major ingredient is $SiO_2$, such as silica, silica-alumina, diatomaceous earth and pumice and more particularly those containing more than 80% $SiO_2$. Silica and diatomaceous earth are the most suitable carriers. The proportion of such carrier is metallic nickel to carrier being 1 : 0.1 – 20, preferably 1 : 1 – 10, by weight.

As mentioned above the most important factor is the proportion of active components in the catalyst; thus the method for supporting the active components on the carrier is not limited to specific procedure and any conventional process, for example, impregnation, spraying, precipitation or coprecipitation, can be employed. Of the aforementioned processes, impregnation is recommended; it is easy to handle in preparation of the catalyst and with impregnation, a catalyst of uniform quality is obtained from each preparation.

The method for preparing the catalyst will now be illustrated in detail. For example, diatomaceous earth is impregnated with an aqueous solution of metal salts corresponding to required active components, for example, nickel nitrate, cobalt nitrate and aluminum nitrate. The impregnated diatomaceous earth is then dried and calcined in air and subjected to reduction treatment with hydrogen.

In the coprecipitation process, diatomaceous earth is mixed with an aqueous solution containing nickel nitrate, cobalt nitrate and aluminum nitrate, then an aqueous ammonia is added drop by drop while the mixture is being agitated. According to this treatment, hydroxides derived from said salts are coprecipitated on the diatomaceous earth. The diatomaceous earth so treated is then dried, calcined and subjected to reduction treatment whereby the catalyst system according to this invention is obtained.

The advantages of this invention are obtained only when the oxide of certain class of metal is used as one ingredient of said active components in the catalyst. One of the important discoveries of the present inventors is that, if a certain metal oxide, such as alumina and titania, is employed as a carrier and the proportion of all components including such metal oxide is substantially the same as in the catalyst according to this invention, the effects intended by this invention can not be obtained. The reason for these phenomena is not clear, but the phenomena will be illustrated specifically on the basis of the results of comparative experiments given hereinafter.

Among the catalyst components, metallic nickel is the main active component for reduction reaction; metallic iron and/or cobalt serve as co-catalyst or promotor, increasing the reduction activity of the metallic nickel.

The function of the hardly reducible metal oxide is to disperse the nickel, iron and cobalt atoms uniformly throughout the catalyst; further, since said oxide is stable at the high temperature encountered in the reaction, it acts to prevent semi-fusion of the catalyst at the high temperature. Thus, such hardly reducible metal oxide is an essential component in order to maintain the activity of the catalyst at high temperature for a long time. Metallic cobalt is a suitable component from the view of maintaining catalyst life. On the other hand, when long catalyst life is a secondary factor and high selectivity to tetrahydrofuran is primary, metallic iron is suitable. In some cases, both metallic iron and cobalt may be employed.

The reaction according to this invention is conveniently carried out by use of catalyst incorporated in another auxiliary active component. For example, metallic copper may be incorporated into the catalyst in order to make it play an important role to prevent a side reaction which produces an undesirable compound, for example, an alcohol such as propanol and butanol. The amount of metallic copper incorporated ranges from 0.02 to 10 parts, preferably 0.1 to 6 parts, by weight, per part of metallic nickel.

The feed compounds to be treated according to this invention include maleic acid, maleic anhydride, esters of maleic acid, fumaric acid, esters of fumaric acid, succinic acid, succinic anhydride, esters of succinic acid and γ-butyrolactone and in practical operation at least one of such compounds is treated. According to this invention employing the catalyst abovementioned, it is possible to obtain tetrahydrofuran in a high yield by one-step hydrogenation of the feed compounds, and simultaneously to recover γ-butyrolactone as product or as intermediate material to be recycled to the reaction zone. If preparation of γ-butyrolactone is desired rather than tetrahydrofuran, the hydrogenation is conveniently carried out under conditions milder than those required for the preparation of tetrahydrofuran — that is, a lower pressure and temperature and a shorter reaction time are employed.

Under the conditions, a total yield of γ-butyrolactone and tetrahydrofuran is over at least 70 percent, and in some cases reaches 90 percent with the very low formation of by-products.

The temperature and pressure used depend upon the catalyst components used, the proportion thereof and the purpose of the reaction, but they should be selected to form most suitable reaction atmosphere. Too low a reaction temperature lowers the reaction rate and is not commercially practical; on the other hand, too high a temperature increases the reaction rate to a point where various by-products are formed and this decreases the yield of desired products. Therefore, in general, though these are not critical limitations, a temperature of from 150° to 400°C, preferably 230° to 400°C, and a hydrogen pressure of 100 to 600 atm., preferably 200 to 500 atom., are employed. However, if the main product is to be γ-butyrolactone, the preferred temperature range is 150°C to 300°C.

The reaction time is closely correlated with the temperature and pressure employed, and varies depending upon the temperature-pressure combination; ordinarily, from 1 to 15 hours is sufficient.

The reaction according to this invention can be carried out in the presence of or without using a solvent. However, since the reaction is exothermic in nature, it is convenient to use a solvent in order to ensure good control of the temperature and to prevent the temperature from going too high during the reaction. As the solvent, a heat stable compound is preferred, for example, dioxane and ethyl acetate. The reaction products of this invention, γ-butyrolactone and tetrahydrofuran, are also suitable for use as the solvent. This is convenient since it eliminates need for separating solvent from the product. The amount of the solvent used can be adjusted over a wide range but the proportion of reactant to solvent is preferably 1 : 0.1 − 10, by weight.

The reaction of this invention can be carried out by any conventional process, batch or continuous, or sometime multistage process. Furthermore, any type of catalyst bed, fixed, moving or fluidized, can be used successfully.

According to this invention, tetrahydrofuran is produced with high selectivity and high conversion ratio on a commercial scale. Moreover, this method is applicable for producing γ-butyrolactone with a high yield.

However, the essence of the present invention is directed to the production of tetrahydrofuran as a main product from maleic anhydride and/or homologues thereof by one-step hydrogenation. A high yield of tetrahydrofuran, high product ratio of tetrahydrofuran to γ-butyrolactone and a surprisingly low yield of by-products can be achieved, without adjusting any reaction conditions in accordance with the respective steps.

This invention will now be illustrated in detail by means of Examples, but it should be understood that the following Examples are given only for explanation and are not intended to limit the scope of this invention. "Parts" and "percentages" are given by weight unlesss otherwise indicated. Mole percent is given as follows.

proportion of by-products (mole percent)

$$= \frac{\text{total number of carbon atoms in the by-product}}{\text{number of carbon atoms in the feed compound}} \times 100$$

proportion of desired products (mole percent)

$$= \frac{\text{mole of the desired product}}{\text{mole of the feed compound}} \times 100$$

EXAMPLE 1

A. Preparation of catalyst

Nickel nitrate, cobalt nitrate and aluminum nitrate, the proportion of Ni, Co and Al$_2$O$_3$ being 20, 10 and 10 parts respectively, were dissolved in 10 parts of water at 80°C. 60 parts of diatomaceous earth was impregnated with the solution so prepared and dried at 80° − 100°C for 10 hours, then calcined in air at 350°C for 4 hours to decompose the salts and finally reduced under hydrogen atmosphere at 400°C for 20 hours. The catalyst thus obtained consisted of 60 percent diatomaceous earth, 20% Ni, 10% Co and 10% Al$_2$O$_3$.

B. Hydrogenation process

A 200 c.c. capacity autoclave shaker was charged with 50 g of maleic anhydride, 44 g of tetrahydrofuran as solvent and 20 g of the catalyst prepared as above and hydrogen was introduced. The hydrogenation reaction was carried out at a temperature of 270°C and pressure of 400 atm. for 4 hours, then the reaction system was permitted to cool.

The reaction product so obtained was analyzed by means of gas chromatography. It was found that the product contained 70 g of tetrahydrofuran and 1 g of γ-butyrolactone and that the proportion of tetrahydrofuran, γ-butyrolactone and unreacted raw material which usually comprises a smaller amount of maleic anhydride and a larger amount of succinic anhydride was 70 mole percent, 3 mole percent and 27 mole percent, respectively.

EXAMPLES 2 − 32

Various catalysts were prepared according to the procedures as in Example 1 but the proportions and kinds of active components were changed. Procedures similar to those in Example 1 were employed but the temperature, pressure, reaction time and feed compound were changed.

The conditions and results are given in Table 1 together with those of Example 1 and Comparative tests 1 to 6. In Examples 1 − 19 tetrahydrofuran was the main product. Although in Examples 20 to 32 γ-butyrolactone was the main product, they are shown for the illustration of one of the characteristic features claimed in the present invention. When milder conditions are employed, a very high total yield of γ-butyrolactone and tetrahydrofuran can be obtained, rendering by-product to become less. In the Table 1, "+" means production of a small amount of the product, less than 0.5 mole percent, and "−" means no production of the product or no employment of the carrier or the solvent. The following Examples show that if metal oxide is employed as carrier in the catalyst system, the results are not so good as when metal oxide is employed as active component in the catalyst.

COMPARATIVE TEST 1

Nickel nitrate and aluminum nitrate in the proportion of 30 parts Ni to 15 parts Al$_2$O$_3$ were dissolved in 10 parts of water at 80°C. 55 parts of diatomaceous earth was impregnated with the solution, dried at 80° − 100°C for 10 hours and calcined in air at 350°C for 4 hours to decompose the salts, and then subjected to reduction treatment at 400°C for 20 hours under hydrogen atmosphere whereby Ni-Al$_2$O$_3$ catalyst was obtained. 20 g of the catalyst so prepared was employed and hydrogenation reaction of maleic anhydride was carried out under the same conditions in Example 1.

The reaction product consisted of 48 mole percent of tetrahydrofuran, 12 mole percent of γ-butyrolactone, 5 mole percent of by-products and 35 mole percent of unreacted maleic anhydride.

In comparison with the results obtained in Example 1, the production of tetrahydrofuran was low and the content of by-products and unreacted material high. Therefore it is believed that the catalyst in this Example possessed low activity.

COMPARATIVE TEST 2

In order to compensate for the low activity of the Ni-Al$_2$O$_3$ catalyst in Comparative test 1, the reaction temperature was raised to 290°C, other conditions being the same as in Comparative test 1. A reaction product consisting of 72 mole percent of tetrahydrofuran, 5 mole percent of γ-butyrolactone, 15 mole percent of by-products and 8 mole percent of unreacted maleic anhydride was obtained. Though the raising in reaction temperature increased the production of tetrahydrofuran and decreased the amount of unreacted maleic anhydride, there was an increase in amount of by-products. Accordingly, the method described by this Example is also unsatisfactory for commercial practice.

COMPARATIVE TEST 3

As in Comparative test 1, Ni-Fe catalyst (Ni : 30, Fe : 15 and diatomaceous earch : 55) was prepared from an aqueous solution containing nickel nitrate and ferric nitrate and diatomaceous earth. Employing the catalyst so obtained maleic anhydride was hydrogenated as in Example 1. The reaction product consisted of 11 mole percent of tetrahydrofuran, 53 mole percent of γ-butyrolactone, 5 mole percent of by-products and 31 mole percent of unreacted maleic anhydride.

In comparison with the results obtained in Example 1, the production of tetrahydrofuran was low and amount of unreacted material high. Thus, the activity of the catalyst was low.

COMPARATIVE TEST 4

The procedures in Comparative test 3 were repeated except that a reaction pressure of 550 atm. was used to compensate for the low activity of the catalyst. The reaction product consisted of 45 mole percent of tetrahydrofuran, 33 mole percent of γ-butyrolactone 18 mole percent of by-products and 4 mole percent of unreacted maleic anhydride. That is, the production of tetrahydrofuran was increased but there was also an increase in by-products and, therefore, the method of this Example was also unsatisfactory for commercial practice.

COMPARATIVE TEST 5

Nickel nitrate, cobalt nitrate and copper nitrate in the proportion of 40 parts, 20 parts and 20 parts Ni, Co and Cu respectively were admixed and melted at 90°C. 20 parts of alumina was impregnated with the molten mix, calcined at 350°C for 4 hours to decompose the salts and then subjected to reduction treatment in a hydrogen atmosphere at 400°C for 20 hours to obtain a Ni-Co-Cu catalyst which was supported on an alumina carrier.

20 g of the catalyst so obtained was employed and, according to the procedures in Example 1, hydrogenation of the maleic anhydride was carried out. The reaction product obtained consisted of 12 mole percent of tetrahydrofuran, 21 mole percent of γ-butyrolactone, 3 mole percent of by-products and 64 mole percent of unreacted maleic anhydride.

A large amount of unreacted maleic anhydride existed and this fact proved the lower activity of the catalyst.

COMPARATIVE TEST 6

The procedures in Comparative test 5 were repeated except that an increased reaction temperature of 300°C was employed to compensate for the low catalyst activity, but the product obtained consisted of 40 mole percent of tetrahydrofuran, 5 mole percent of γ-butyrolactone, 40 mole percent of by-products and 15 mole percent of unreacted maleic anhydride. That is, the increased production of tetrahydrofuran was achieved accompanied by the formation of a large amount of by-products.

From the facts in Comparative tests 5 and 6, it is noted that the effects intended according to this invention are achieved by employing a catalyst system in which metal oxide is incorporated as an active component, if the metal oxide is used as carrier supporting the active components, which comprise metallic nickel and metallic cobalt, and metallic copper if desired, the intended effects cannot be achieved although the proportion of metallic nickel, metallic cobalt, metallic copper and metal oxide is substantially the same as in the catalyst according to this invention such as indicated in Example 10 or 29.

Above all, comparative tests clearly show that any combination of active catalyst components other than those of the present invention does not cause a total yield of γ-butyrolactone and tetrahydrofuran to exceed 70 percent, without an excess of 10 percent yield of by-products.

TABLE 1

| Example No. | Raw materials | Catalysts Active components | Proportion of active components | Carriers | Proportion of carriers in catalysts (wt.%) | Reaction conditions Solvents | Temp. (°C) | Pressure (atm.) | Time (hrs.) | Yield of products THF (mole %) | γ-BL (mole %) | By-products (mole %) | Unreacted raw materials (mole %) |
|---|---|---|---|---|---|---|---|---|---|---|---|---|---|
| 1 | MA | Ni-Co-Al$_2$O$_3$ | 1-1/2-1/2 | DE | 60 | THF | 270 | 400 | 4 | 70 | 3 | + | 27 |
| 2 | SA | Ni-Co-Al$_2$O$_3$ | 1-1/6-1/6 | DE | 60 | THF | 265 | 400 | 4 | 65 | 15 | 4 | 16 |
| 3 | DPS | Ni-Fe-Al$_2$O$_3$ | 1-1/8-1/2 | DE | 60 | DO | 290 | 350 | 4 | 68 | 21 | 7 | 4 |
| 4 | MA | Ni-Fe-Al$_2$O$_3$ | 1-1/2-1/2 | DE | 70 | THF | 280 | 400 | 8 | 90 | + | + | 10 |
| 5 | SA | Ni-Co-TiO$_2$ | 1-1-1 | DE | 40 | - | 280 | 420 | 5 | 68 | 21 | 5 | 6 |
| 6 | SA | Ni-Co-MoO$_2$ | 1-3/4-3/4 | DE | 60 | THF | 280 | 400 | 4 | 57 | 22 | 2 | 19 |
| 7 | SA | Ni-Fe-ThO$_2$ | 1-1-1/4 | Silica | 60 | - | 290 | 450 | 4 | 61 | 21 | 9 | 9 |
| 8 | γ-BL | Ni-Co-Fe-Al$_2$O$_3$ | 1-2/3-1/3-7/15 | DE | 60 | THF | 270 | 300 | 4 | 81 | + | 6 | 13 |
| 9 | SA | Ni-Cu-Co-Al$_2$O$_3$ | 1-1/2-2-1 | DE | 50 | THF | 280 | 450 | 4 | 59 | 25 | 2 | 14 |
| 10 | MA | Ni-Cu-Co-Al$_2$O$_3$ | 1-1/2-1-1/2 | DE | 50 | THF | 290 | 400 | 8 | 89 | + | 9 | 2 |
| 11 | MA | Ni-Co-Fe-Al$_2$O$_3$ | 1-1/2-1/2-1/2 | DE | 60 | THF | 270 | 500 | 6 | 69 | 24 | 7 | + |
| 12 | SA | Ni-Cu-Fe-Al$_2$O$_3$ | 1-1/10-1/2-1/2 | DE | 50 | THF | 285 | 400 | 8 | 85 | 5 | 7 | 3 |
| 13 | SA | Ni-Cu-Co-Fe-Al$_2$O$_3$ | 1-1/2-1-1/4-1/2 | DE | 50 | THF | 290 | 400 | 6 | 45 | 32 | 3 | 20 |
| 14 | SA | Ni-Cu-Co-TiO$_2$ | 1-1/2-1-1/2 | DE | 50 | - | 285 | 420 | 5 | 65 | 25 | 3 | 7 |
| 15 | SA | Ni-Cu-Co-MoO$_2$ | 1-1/4-1/2-1/2 | DE | 60 | THF | 270 | 400 | 4 | 59 | 20 | 1 | 20 |
| 16 | SA | Ni-Cu-Fe-ThO$_2$ | 1-1-1-1 | Silica | 60 | - | 290 | 450 | 5 | 51 | 40 | 7 | 2 |
| 17 | SA | Ni-Co-B$_2$O$_3$ | 1-1/10-1/10 | DE | 70 | THF | 280 | 500 | 5 | 85 | 7 | 8 | + |
| 18 | M | Ni-Co-Al$_2$O$_3$ | 1-1/2-1/2 | DE | 60 | THF | 280 | 400 | 5 | 62 | 18 | 5 | 15 |
| 19 | S | Ni-Cu-Co-Al$_2$O$_3$ | 1-1/5-1/2-1/2 | DE | 60 | THF | 270 | 400 | 4 | 60 | 23 | 3 | 14 |

Table I—Continued

| Example No. | Raw materials | Catalysts Active components | Proportion of active components | Carriers | Proportion of carriers in catalysts (wt.%) | Reaction conditions Solvents | Temp. (°C) | Pressure (atm.) | Time (hrs.) | Yield of products THF (mole %) | γ-BL (mole %) | By-products (mole %) | Unreacted raw materials (mole %) |
|---|---|---|---|---|---|---|---|---|---|---|---|---|---|
| 20 | MA | Ni-Co-Al₂O₃ | 1-1-1 | DE | 60 | THF | 240 | 400 | 4 | 15 | 69 | + | 16 |
| 21 | DPS | Ni-Co-Al₂O₃ | 1-6-1 | DE | 30 | DO | 270 | 400 | 4 | 31 | 49 | 6 | 14 |
| 22 | SA | Ni-Co-Al₂O₃ | 1-2-1 | DE | 50 | THF | 235 | 300 | 4 | 7 | 91 | 1 | 1 |
| 23 | MA | Ni-Fe-Al₂O₃ | 1-1/6-1 | DE | 60 | – | 240 | 400 | 4 | 7 | 83 | 2 | 8 |
| 24 | SA | Ni-Fe-Al₂O₃ | 1-2/5-2/5 | P | 60 | THF | 230 | 300 | 3 | 2 | 93 | + | 5 |
| 25 | MA | Ni-Fe-TiO₂ | 1-2-1 | DE | 60 | γ-BL | 250 | 400 | 4 | 8 | 68 | 2 | 22 |
| 26 | MA | Ni-Fe-V₂O₃ | 1-1/6-1/3 | DE | 60 | DO | 230 | 300 | 4.5 | 6 | 82 | 1 | 12 |
| 27 | SA | Ni-Co-CaO | 1-1-1/2 | DE | 60 | – | 220 | 250 | 10 | 9 | 90 | + | 1 |
| 28 | SA | Ni-Co-MnO₂ | 1-3/20-1/2 | DE | 60 | – | 265 | 380 | 6 | 38 | 50 | 1 | 11 |
| 29 | SA | Ni-Cu-Co-Al₂O₃ | 1-1/2-1/2-1/2 | DE | 60 | – | 290 | 300 | 4 | 33 | 55 | 4 | 8 |
| 30 | SA | Ni-Cu-Fe-Al₂O₃ | 1-2/3-1-2/3 | P | 60 | THF | 230 | 310 | 3 | 2 | 98 | 0 | 0 |
| 31 | MA | Ni-Cu-Co-Al₂O₃ | 1-1/3-1-1 | – | – | THF | 250 | 400 | 5 | 18 | 59 | 4 | 19 |
| 32 | MA | Ni-Cu-Co-B₂O₃ | 1-1/6-10/9-5/9 | DE | 60 | γ-BL | 265 | 400 | 5 | 27 | 54 | 2 | 17 |
| C.1 | MA | Ni-Al₂O₃ | 1-1/2 | DE | 60 | THF | 270 | 400 | 4 | 48 | 12 | 5 | 35 |
| C.2 | MA | Ni-Al₂O₃ | 1-1/2 | DE | 60 | THF | 290 | 400 | 4 | 72 | 5 | 15 | 8 |
| C.3 | MA | Ni-Fe | 1-1/2 | DE | 55 | THF | 270 | 400 | 4 | 11 | 53 | 5 | 31 |

TABLE 1—Continued

| Example No. | Raw materials | Catalysts | | | | Reaction conditions | | | | | Yield of products | | | Unreacted raw materials (mole %) |
|---|---|---|---|---|---|---|---|---|---|---|---|---|---|---|
| | | Active components | Proportion of active components | Carriers | Proportion of carriers in catalysts (wt.%) | Solvents | Temp. (°C) | Pressure (atm.) | Time (hrs.) | | THF (mole %) | γ-BL (mole %) | By-products (mole %) | |
| C.4 | MA | Ni-Fe | 1-1/2 | DE | 55 | THF | 270 | 550 | 4 | | 45 | 33 | 18 | 4 |
| C.5 | MA | Ni-Co-Cu | 1-1/2-1/2 | Alumina | 20 | THF | 270 | 400 | 4 | | 12 | 21 | 3 | 64 |
| C.6 | MA | Ni-Co-Cu | 1-1/2-1/2 | Alumina | 20 | THF | 300 | 400 | 4 | | 40 | 5 | 40 | 15 |

Note:

MA: Maleic anhydride
SA: Succinic anhydride
DPS: Dipropyl succinate
M: Maleic acid
S: Succinic acid
γ-BL: γ-butyrolactone
THF: Tetrahydrofuran
DE: Diatomeceous earth
P: Pumice
DO: Dioxane
C.1-6: Comparative tests Unreacted raw materials in the extreme right column includes unreacted starting materials and succinic anhydride, succinic acid or esters thereof when any one of maleic anhydride, maleic acid, fumaric acid or esters of said acids is used as a starting material. For the sake of clarity, the following interrelationship will help for better understanding as noted below:

| Starting Materials | Unreacted Raw Materials |
|---|---|
| MA | MA + SA |
| M | M + S |
| Fumaric Acid | Fumaric Acid + S |
| Ester of M | Esters of M and S |
| Ester of Fumaric Acid | Esters of Fumaric Acid and S |

What is claimed is:

1. A process for producing tetrahydrofuran which comprises:
   a. reacting gaseous hydrogen with at least one compound selected from the group consisting of maleic acid, maleic anhydride, fumaric acid, succinic acid, succinic anhydride, esters of said acids, and γ-butyrolactone at 150° to 400°C and at a hydrogen pressure of 100 to 600 atmospheres in the presence of an effective amount of a catalyst system until said tetrahydrofuran is formed,
      1. the effective components of said catalyst system consisting of an intimate mixture of one part metallic nickel, 0.04 to 10 parts of at least one oxide of a metal selected from the group consisting of beryllium, magnesium, calcium, boron, aluminum, titanium, vanadium, chromium, manganese, zinc, zirconium, tungsten, molybdenum, and thorium, and 0.02 to 10 parts of at least one metallic member selected from the group consisting of iron and cobalt, said parts being by weight.

2. A process according to claim 1, wherein said feed compound is at least one member selected from the group consisting of maleic anhydride, succinic anhydride, esters of succinic acid and γ-butyrolactone.

3. A process according to claim 1, wherein said catalyst includes a catalyst carrier whose major ingredient is $SiO_2$.

4. A process according to claim 3, wherein said catalyst carrier is at least one member selected from the group consisting of diatomaceous earth and silica.

5. A process according to claim 3, wherein said catalyst carrier is used in a proportion of metallic nickel : catalyst carrier of 1 : 0.1 – 20, by weight.

6. A process as set forth in claim 1, wherein said metal is aluminum.

7. A process as set forth in claim 1, wherein said temperature and said pressure are held essentially constant during said reacting.

* * * * *